Feb. 8, 1955    A. W. KEEN    2,701,708
METHOD AND APPARATUS FOR PRODUCING LATEX FOAM
Filed Sept. 26, 1952
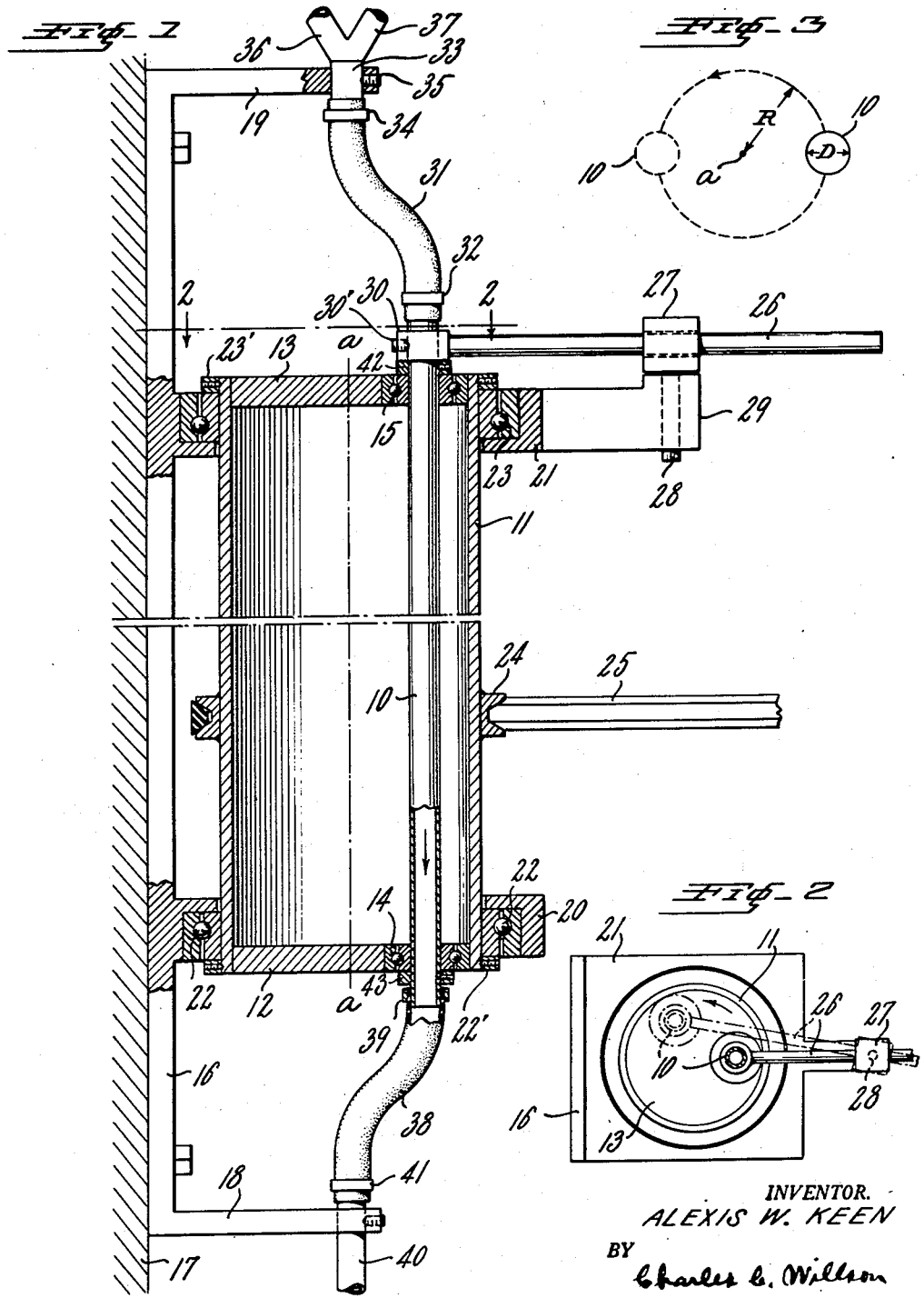
INVENTOR.
ALEXIS W. KEEN
BY
Charles L. Willson
ATTORNEY _United States Patent Office_

2,701,708
Patented Feb. 8, 1955

2,701,708

METHOD AND APPARATUS FOR PRODUCING LATEX FOAM

Alexis W. Keen, Packanack Lake, N. J., assignor to United States Rubber Company, New York, N. Y., a corporation of New Jersey Application September 26, 1952, Serial No. 311,676

3 Claims. (Cl. 259—3)

This invention relates to an improved method of and apparatus for mixing natural or synthetic rubber latex with soap froth to produce well mixed latex foam in a continuous stream, for use in manufacturing foam rubber or sponge rubber.

Foam rubber articles have been produced for years by compounding natural or synthetic rubber latex with certain ingredients, such as vulcanizing agents, accelerators, gelling agents and stabilizers, and then whipping the latex into a foam. The foam is then deposited in a mold, allowed to gel by permitting it to rest at room temperature or a somewhat higher temperature, and is vulcanized to form molded sponge rubber articles.

Foam rubber when prepared by whipping the latex into a foam, as above described, has a non-uniform cellular structure, since bubbles of various sizes are produced by the air introduced in the latex during the whipping operation. Furthermore the cell structure is destroyed to some extent by the mechanical working of the latex after the gelling agent has been added. This mechanical working also produces uneven coagulation of the latex, which produces a weak, fibrous sponge structure and allows the latex to deposit upon the parts in the mixing receptacle which it contacts.

Another serious difficulty experienced with the apparatus used heretofore for producing latex foam by whipping or forcing air into the latex is due to the fact that it does not permit continuous production, because the latex coagulates on and coats the parts of the apparatus it contacts, and necessitates frequent shutting down of the operating mechanism to clean the same.

It has also been proposed heretofore to produce latex foam by first producing a froth such as an albumen froth or soap froth, and then mixing latex with this froth, so that the latex will form a film over the small froth bubbles to produce latex foam, but it is found difficult to thoroughly mix the latex with the froth without substantially altering the cell structure, and difficulty has also been experienced heretofore due to the latex becoming deposited upon the apparatus employed to mix the latex with the froth.

The present invention obviates the above-mentioned difficulties experienced heretofore in making latex foam, and provides a simple, practical and inexpensive method and apparatus for producing a highly uniform latex foam in a continuous stream. This is accomplished by producing a soap froth of controlled bubble size to which is added the desired amount of latex containing a sensitizer and other compounding agents. This soap froth and latex are then thoroughly mixed, in accordance with the present invention, by being forced through a long, slender mixing tube or mixing pipe, while this tube is being rapidly revolved in a circular path about a fixed axis disposed some distance to one side of the tube. Throughout this circular movement the tube is prevented from rotating upon its own axis. The effect of this is to cause the stream of material flowing through the tube to be forced by centrifugal force successively in all directions in the tube during the course of each cycle. This action, combined with the forces of diffusion, causes a uniform mixing without any change in bubble size.

The mixing tube employed in carrying out the present invention need have an inside diameter of only about one inch to supply the latex foam on a large production scale, since the foam mix is forced rapidly through the tube under pressure, and a thorough mixing of the soap foam and latex is secured by revolving the mixing tube rapidly around the circular path above mentioned. In this manner the desired mixing is secured without the use of stirring blades, baffles or other projections which, in addition to changing the cell size and structure, would become rapidly fouled with coagulum. The entire mixing operation is carried out in a straight tube only two or more feet long and having a smooth bore free from obstructions.

The above and other features of the present invention will be further understood from the following description when read in connection with the accompanying drawing showing one good practical form of apparatus for carrying out the method.

In the drawing,

Fig. 1 is a side elevation with parts in section of apparatus for mixing soap froth with latex in accordance with the present method;

Fig. 2 is a sectional view taken on the line 2—2 of Fig. 1; and

Fig. 3 is a diagram showing the planetary path in which the mixing tube travels.

In accordance with the present invention the soap froth is mixed with sensitized latex within a relatively long slender tube the length of which greatly exceeds the diameter of its bore. This mixing tube may be formed of metal or other suitable material and is designated by 10 in the drawing. This tube 10 will operate satisfactorily whether supported in a horizontal or vertical position, but it preferably is supported in a vertical position as shown, so that gravity will assist the flow of the materials to be mixed therethrough.

This tube, in accordance with the present invention, is moved bodily in a circular path by mounting it in an off-center position upon a rotating body. The tube 10 is shown as mounted in a supporting frame such as a cylinder, and is disposed some distance from the central longitudinal axis of such cylinder. This cylinder comprises a tubular body 11 preferably formed of metal and the ends of this tube are closed by the heads 12 and 13 which are fitted in the cylinder and welded in place. The mixing tube 10 extends through these heads to one side of the central axis of the supporting cylinder as shown, and this tube is journalled in the heads 12 and 13 by a lower ball bearing 14 and upper ball bearing 15. The outer ring of each of these ball bearings is rigidly secured to the head and the inner ring of such ball bearing is rigidly secured to the tube 10.

The tube supporting frame comprising the cylindrical body 11 and heads 12, 13 is rotatably mounted upon a supporting frame, such as the cast iron frame 16 shown as bolted to an upright wall 17. This frame has a lower projecting bracket 18 and upper projecting bracket 19. It also has the lower bearing supporting ring 20 and upper bearing supporting ring 21. These rings support the cylindrical member 11 by means of a lower ball bearing 22 and upper ball bearing 23, so that the cylindrical member 11 is rotatable within the rings. The outer race of the bearing 22 is tightly fitted in the lower ring 20, and the inner race of this bearing is engaged by a ring 22' that is secured by set screws to the cylinder 11. The outer race of the bearing 23 is fitted in the upper ring 21, and the inner race of this bearing is engaged by a ring 23' secured to the cylinder 11. These anti-friction bearings 22 and 23 support the cylindrical member 11 in a vertical position for rapid rotation, and the cylinder may be rotated at high speed by the pulley 24 rigidly secured about the cylindrical member and a driving belt 25 which is driven by an electric motor, not shown.

The desired mixing is produced in the mixing tube 10 by causing this tube to revolve rapidly in a circular path about a fixed axis disposed to one side of the tube, and by preventing the tube from rotating about its own axis while it revolves in such circular path. The translation of the tube bodily in a circular path at high speed, while the tube is prevented from turning upon its own axis, causes the fluid therein to be thrown by centrifugal force toward the inner wall of the tube that lies the greatest distance from the central axis $a$—$a$ about which the tube travels; and since this tube does not rotate about its own axis, the material therein will be forced by centrifugal action successively in all directions with a turbulent action which serves effectively to intermix the soap foam and sensitized latex as this stream passes downwardly through the mixing tube 10.

The means shown for preventing the tube 10 from rotating upon its own axis when the tube supporting drum 11 is rotated, is a reciprocating rod 26 which slides back and forth in a supporting block 27 provided with a downwardly extending pin 28 that is journalled in an extension 29 upon the bracket 21. The rod 26 is provided at one end with a ring 30 which embraces the upper end of the mixing tube 10 and the ring is rigidly secured to the tube by the set screw 30'.

The materials to be mixed are supplied to the upper end of the tube 10 by a flexible hose 31, the lower end of which is tightly secured to the upper end of the tube 10 by the clamping ring 32, and the upper end of this hose is tightly secured to a fixed pipe 33 by the clamping ring 34. The pipe 33 is supported by the upper bracket 19 and is clamped in a hole in this bracket by the set screw 35. This pipe 33 is provided with the branch pipes 36 and 37, one of which supplies the sensitized latex and the other provides soap foam. The soap foam may be variously produced so that it will have large or small bubbles as desired for the latex foam to be used, and the size of the bubbles of the soap foam should be as uniform as possible as this will largely control the size and uniformity of the cells in the finished latex foam.

The latex and soap foam are preferably supplied by the pipes 36 and 37 under appreciable pressure, i. e., it is introduced at a higher pressure than the pressure at the point of delivery from the apparatus. The pressure serves to force these materials downwardly through the pipe connections at the desired delivery speed. A pressure above atmospheric is necessary in the mixing tube because the mixed latex and soap froth will not flow through the tube under their own weight.

After these materials have passed through the mixing tube 10 and are thoroughly mixed they pass into the flexible hose 38, the upper end of which is clamped to the tube 10 at 39 and the lower end is clamped to a pipe 40 at 41. This pipe 40 is supported by the lower bracket 18 and the pipe 40 may serve to deliver the mixed latex foam into a vulcanizing mold, not shown. A collar 42 secured to the upper portion of the tube 10 and a collar 43 secured to the lower portion of such tube prevent this tube from moving lengthwise in the supporting cylinders 11, 12, 13.

Fig. 3 shows that the mixing tube 10 revolves in a circular path about a central axis $a$. The flexible hose connections 31 and 38 accommodate this circular translation of the tube 10, and since this tube does not rotate about its own axis more than the slight amount permitted by the holding rod 26, the mixing tube 10 will not unduly twist the hose lengths 31 and 38.

Referring further to Fig. 3, D indicates the internal diameter of the mixing tube 10, and R equals the radius of the circle in which the tube 10 travels bodily. It is believed desirable in all constructions that R should be considerably greater than D. This is because a tube of relatively small diameter will, because of its continuous operation, supply a large quantity of mixed latex foam, but in order to impart a substantial centrifugal force to the materials passing through this tube, without the necessity of turning the cylinder 11 at excessively high speed, R should be several times as great as D. The tube 10 need be only two or three feet long, and the cylinder 11 should be rotated at from 1000 to 2000 R. P. M.

It will be seen from the foregoing that the rate at which the tube 10 is revolved in a circular path, the radius of this path, the inner diameter of the tube 10, the rate at which the latex and soap froth are forced through the tube, and the length of the tube, all have a bearing on the extent of intermixing obtained. It is apparent that any or all of these factors may be varied in order to obtain the type of mixing desired. The size of the tube is selected so that a rate of flow may be maintained that is sufficient to insure mixing before the gelling action has proceeded to the point where coagulum will attach to the walls of the tube. The pressure used to force the materials downwardly through the tube 10 helps to keep latex from depositing on its smooth inner walls, but if it should become occasionally fouled with deposited latex it can be easily cleaned, say at the end of a day's run, by disconnecting the upper hose 31 and lower hose 38 so that the bore of the tube can be swabbed out or otherwise cleaned.

Having thus described my invention, what I claim and desire to protect by Letters Patent is:

1. The method of producing latex foam in a continuous stream which comprises, providing a long slender mixing tube, rapidly revolving this tube bodily in a planetary path about a central axis disposed some distance to one side of the tube, continuously streaming soap froth and latex through the tube by feeding the froth and latex through the tube under pressure, so that this stream is forced laterally in the tube by centrifugal force against one wall and then another of the tube with a turbulent action to thoroughly mix the latex with the soap froth as they pass through the tube.

2. The method of producing latex foam in a continuous stream, which comprises providing a long, slender mixing tube, rapidly revolving this tube bodily in a circular path about a fixed axis outside said tube so that the radius of said path is several times greater than the inside diameter of said tube, holding the tube to restrict its oscillation to less than one-half turn about its own axis, and pressure feeding a stream of soap froth and latex through the tube, so that this stream is forced turbulently toward the successive side walls of the tube, to thoroughly mix the latex with the soap foam as they pass through the tube.

3. Apparatus for producing latex foam in a continuous stream, comprising a rotating body having spaced rigidly connected heads, a long, slender unobstructed cylindrical mixing tube journalled in said heads so that the entire tube is disposed to one side of the axis of rotation of said body, mechanism for pressure-feeding a stream of soap froth and latex through the tube, means for rapidly rotating said body to thereby revolve the tube bodily in a circular path about an axis outside said tube, and means for preventing the tube from oscillating more than one-half turn about its own axis, so as to force said stream turbulently towards successive walls of the tube, to thoroughly mix the latex with the foam as they pass through the tube.

References Cited in the file of this patent

UNITED STATES PATENTS

| | | |
|---|---|---|
| 347,378 | Puffer | Aug. 17, 1886 |
| 458,662 | Pendleton | Sept. 1, 1891 |
| 769,330 | Timby | Sept. 6, 1904 |
| 2,324,988 | Greenup et al. | June 20, 1943 |